US006490296B2

(12) United States Patent
Shenoi et al.

(10) Patent No.: US 6,490,296 B2
(45) Date of Patent: Dec. 3, 2002

(54) MULTI-LINK SEGMENTATION AND REASSEMBLY FOR BONDING MULTIPLE PVC'S IN AN INVERSE MULTIPLEXING ARRANGEMENT

(75) Inventors: Kishan Shenoi, Saratoga; Gary Jacobsen, San Jose; Kamila Kraba, Santa Clara; Chien-Chou Lai, Sunnyvale; Jeremy Sommer, Mountain View; Jining Yang, Sunnyvale, all of CA (US)

(73) Assignee: Symmetricom, Inc., San Jose, CA (US)

( * ) Notice: Subject to any disclaimer, the term of this patent is extended or adjusted under 35 U.S.C. 154(b) by 0 days.

(21) Appl. No.: 09/974,177

(22) Filed: Oct. 10, 2001

(65) Prior Publication Data

US 2002/0146010 A1 Oct. 10, 2002

Related U.S. Application Data

(60) Provisional application No. 60/272,412, filed on Feb. 28, 2001, and provisional application No. 60/272,413, filed on Feb. 28, 2001.

(51) Int. Cl.$^7$ ................................................. H04J 3/16
(52) U.S. Cl. ........................................ 370/469; 370/474
(58) Field of Search ................................ 370/236, 394, 370/395.41, 395.42, 397, 399, 412, 428, 469, 474

(56) References Cited

U.S. PATENT DOCUMENTS

| | | | | |
|---|---|---|---|---|
| 5,608,733 A | * | 3/1997 | Vallee et al. ............. | 370/241.1 |
| 5,617,417 A | * | 4/1997 | Sathe et al. ................ | 370/394 |
| 5,875,192 A | | 2/1999 | Cam et al. .................. | 370/474 |
| 5,970,067 A | * | 10/1999 | Sathe et al. ................ | 370/394 |
| 6,134,246 A | * | 10/2000 | Cai et al. .................... | 370/394 |
| 6,167,049 A | | 12/2000 | Pei et al. | |
| 6,222,858 B1 | * | 4/2001 | Counterman ........... | 370/395.21 |

OTHER PUBLICATIONS

"The PPP Multilink Protocol (MP)," rfc 1990, available at: http://www/cis.ohio–state.edu/htbin/rfc/rfc1990.html. From the Internet Engineering Task Force (IETF). Printed Jan. 29, 2002.
UTOPIA Specification, Level 1, Version 2.01, Mar. 21, 1994. The ATM Forum Technical Committee, af–phy–0017.000. Available at http://www.atmforum.com.
UTOPIA Level 2, Version 1.0, Jun. 1995, The ATM Forum Technical Committee, af–phy–0039.00. Available at http://www.atmforum.com.
"Inverse Multiplexing for ATM (IMA), Specification Version 1.1," The ATM Forum Technical Committee, af–phy–0086.001, Mar. 1999. Available at http://www.atmforum.com.
Co–Pending U.S. Provisional application, Ser. No. 60/344, 542, filed Nov. 7, 2001.
International Search Report re PCT/US02/05878 Jun. 13, 2002.

* cited by examiner

Primary Examiner—Melvin Marcelo
Assistant Examiner—Inder Pal Mehra
(74) Attorney, Agent, or Firm—Gray Cary Ware & Friedenrich LLP

(57) ABSTRACT

Systems and methods are described for multi-link segmentation and reassembly for bonging multiple virtual circuits in an inverse multiplexing arrangement. A method includes: generating a plurality of multilink segmentation and reassembly sublayer cells at a first location; distributing the plurality of multilink segmentation and reassembly sublayer cells across a plurality of virtual circuits; transmitting the plurality of multilink segmentation and reassembly sublayer cells to a second location via the plurality of virtual circuits; and receiving the plurality of multilink segmentation and reassembly sublayer cells at the second location. An apparatus includes a multilink segmentation and reassembly sublayer transmitter, including: a source buffer; a multilink controller coupled to the source buffer; and a plurality of virtual circuits coupled to the multilink controller.

46 Claims, 5 Drawing Sheets

MULTI-LINK SEGMENTATION AND REASSEMBLY FOR BONDING MULTIPLE PVC'S IN AN INVERSE MULTIPLEXING ARRANGEMENT

CROSS-REFERENCE TO RELATED APPLICATION

This application is a continuation-in-part of, and claims a benefit of priority under 35 U.S.C. 119(e) and/or 35 U.S.C. 120 from, copending U.S. Ser. No. 60/272,412, filed Feb. 28, 2001, and U.S. Ser. No. 60/272,413, filed Feb. 28, 2001, the entire contents of which are hereby expressly incorporated by reference for all purposes.

BACKGROUND OF THE INVENTION

1. Field of the Invention

The invention relates generally to the field of computer networks. More particularly, the invention relates to private computer networks based on asymmetric transfer mode technology. Specifically, a preferred implementation of the invention relates to multi-link segmentation and reassembly for bonding multiple permanent virtual circuits in an inverse multiplexing arrangement.

2. Discussion of the Related Art

Asymmetric Transfer Mode (ATM) is a popular technology for providing secure and reliable Virtual Private Network arrangements. The use of ATM Switches permits the Service Provider (such as an Inter-Exchange Carrier, or "IXC") to better utilize the inter-machine trunking facilities by providing trunk bandwidth only when there are ATM cells available for transmission. This is in contrast with the notion of a (truly) Private Network wherein the Service Provider is required to dedicate the prescribed bandwidth for the end customer in all inter-machine trunking facilities provisioned for the connection.

Consider, for example, an end-user that requires a Private Network linking three separate locations, A, B, and C. Assume that a 56 kbps connection is required between each pair of locations. One approach to providing this service is to have dedicated 56 kbps access links between the customer premises and the Service Provider Network (often called the "cloud") Each location would have two such dedicated "DDS" (Digital Data Service) links. The Service Provider would use Digital Access and Cross-connect Systems ("DACS") to manage the private network. The "cloud" could then be visualized as a multitude of such DACS machines interconnected by trunks. These trunks are usually DS1 links that may be further amalgamated into DS3 or SONET multiplexed assemblies for transmission over long haul facilities. Each 56 kbps link is treated as a D10 and the DACS machines ensure that each 56 kbps link is maintained across the Network by establishing the correct cross-connections. Fundamentally, a 56 kbps link between points A and B require that all intervening DACS machines be appropriately provisioned and that a D10 be reserved in all intervening facilities for that particular link. This reserved D10 represents bandwidth unavailable for any other use. The advantages (to the end-user) of such an arrangement are privacy and availability.

Referring to FIG. 1, an example of a conventional virtual private network is shown where the 56-kbps link between A and C is treated as a D10 (a D10 is a 64 kbps channel). One D10 in the inter-machine trunk labeled IMT-A that interconnects DACS machines D-1 and D-2 is reserved for the link and the cross-connect maps in D-1 and D-2 ensure the connectivity. Since each D10 is a "time-slot" within a DS1, the networking method is referred to as TDM (time division multiplexing). Similarly, the link between A and B requires that a D10 be dedicated in IMT-B and IMT-D and the cross-connect maps in D-1, D-3 and D-4 must be coordinated to ensure connectivity. Likewise, the link between B and C requires the reservation of D10s in IMT-C and IMT-D and the coordination of cross-connect maps in D-2, D-3, and D-4.

Clearly, the access method can be enhanced to DS1 ("T1") whereby the two 56 kbps links at a location are assigned to two D10s in the access DS1. With DS1 (1.544 Mbps) access, the same form of Network (DACS machines interconnected by high-speed trunks) can be deployed to provide links of the form N×64 kbps or N×56 kbps by utilizing multiple D10s per link (N is between 1 and 24, inclusive).

The example depicted in FIG. 2 represents a situation where there is a 8×64=512 kbps link between A and C, a 6×64=384 kbps link between C and B, and a 12×64=784 kbps link between B and A. The corresponding bandwidth must be reserved on the various IMTs connecting the DACS machines. Clearly, no single link in the above example can be greater than 24×64=1536 kbps since we are assuming DS1 access.

A problem with this technology has been that the bandwidth is wasted when there is no data available for transmission. The DSU/CSU used at the customer premise to drive the access segment will fill in null data (such as flags or equivalent fill-in units) to maintain the synchronous data rate (1.544 Mbps). The Service Provider network is unaware of such idle data fill-in units and the associated bandwidth is thus required to transport such useless data across the cloud. Generally speaking, in a TDM-based private network, connectivity is provided at the bit level; in the cloud no determination is made as to whether the bits being transported correspond to actual data or to fill-in units.

The use of ATM technology allows the sharing of access and inter-machine trunks by multiple (logical) links. The underlying premise of ATM is that a data stream can be segmented into cells. The ATM standard calls out for cells that contain 48bytes of user data. Appended to each cell are 5 bytes of overhead that includes an identifier of the destination. This identifier is encapsulated as a combination of "VPI" and "VCI" (for Virtual Path Identification and Virtual Channel Identification). Instead of the DACS machines in the prior example, ATM Switches are deployed and the inter-machine and access trunks carry cells rather than channelized information. The equivalent of cross-connection is performed by the ATM Switches on a cell-by-cell basis, using the VPI/VCI as the underlying pointer to match the ingress and egress trunks from the Switch. A Permanent Virtual Circuit (PVC) is established by provisioning the intervening ATM Switches between the two (or more) points of customer (end-user) access into the ATM cloud. In the configuration of three end-user locations considered above, cells from location A destined to location B will have a prescribed VPI/VCI in the cell-overhead when launched from location A. The 48 bytes of user-data are transported across the cloud though the overhead (i.e., the cell header) may be modified. Cells associated with a specific PVC will always traverse the same route and thus cell sequencing is not an issue. If there is no data available for transmission, the access multiplexer will insert "filler" cells to maintain the synchronous transmission rate of the access link but these filler cells can be discarded by the network. This arrangement is depicted in FIG. 3.

It is certainly possible to create private networks wherein the Network Service Provider maintains TDM links between the various access multiplexers and the ATM (or equivalent) switching capability resides in the CPE equipment. This form of private networking is quite common and, more often than not, the TDM links between multiplexers are T1 links and the access multiplexers in this situation are referred to as T1 multiplexers.

Whereas in TDM-based network arrangements the address or identity of a link is defined by its position (in time) within the DS1 stream, in an ATM-based network the address of the destination is encoded appropriately by the access multiplexer on a cell-by-cell basis. Thus at Location A, data (cells) destined for Location B will be assigned a VPI/VCI, say "a". Likewise access multiplexers in all locations are assigned VPI/VCI codes for each of their PVCs depending on the end points of the PVC (they do not have to be the same code at the two end points of the PVC). The ATM Switches D-1 and D-2 are programmed such that a cell from Location A with VPI/VCI="a" will be delivered to Location C and the VPI/VCI there may be "c". Whereas it is natural to establish the "shortest" path for a link, there is no fundamental restriction to that effect. In fact, the link between A and C may be established by creating a permanent virtual circuit that traverses D-3 as an intermediate step.

Inter-machine trunks can thus carry cells associated with a multiplicity of virtual circuits. Since the bandwidth is used on an "as-needed" basis, the utilization of inter-machine trunks can be optimized on a statistical basis. The drawback is that at times of peak loading, congestion could occur. To best utilize transmission bandwidth, it is commonplace to have buffers to "smooth" the traffic at all switch-trunk interfaces. The presence of buffers introduces delay, and the statistical nature of traffic causes the actual delay to vary about some nominal mean value. In an ideal situation this delay would be fixed (and as small as possible). Whereas delay, and delay-variation, is of less consequence when the data consists of inter-computer communication, the significance is much greater when the data consists of real-time traffic such as voice or video. The Service Provider is supposed to guarantee a certain level of service, often quantified as a QoS (Quality of Service) description that includes, among other quality parameters, the notion of delay and delay-variation.

Problems with current ATM technology include bandwidth constraints, which represent a significant limitation during times of peak network congestion. A potential point-to-point bandwidth increase with an inherent flexibility in data volume transfer for times of congestion is needed. Another problem with the current technology is the instability of the communication links during dynamic reconfiguration between paths of different lengths.

Heretofore, the requirements of providing a flexible point-to-point potential bandwidth increase over an asymmetric transfer mode network link, and stabilizing communication links during dynamic reconfiguration between paths of different lengths referred to above have not been fully met. What is needed is a solution that simultaneously addresses these requirements.

SUMMARY OF THE INVENTION

There is a need for the following embodiments. Of course, the invention is not limited to these embodiments.

According to a first aspect of the invention, a method comprises: generating a plurality of multilink segmentation and reassembly sublayer cells at a first location; distributing the plurality of multilink segmentation and reassembly sublayer cells across a plurality of virtual circuits; transmitting the plurality of multilink segmentation and reassembly sublayer cells to a second location via the plurality of virtual circuits; and receiving the plurality of multilink segmentation and reassembly sublayer cells at the second location. According to a second aspect of the invention, an apparatus comprises: a multilink segmentation and reassembly sublayer transmitter, including: a source buffer; a multilink controller coupled to the source buffer; and a plurality of virtual circuits coupled to the multilink controller.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

Within this application one or more publications are referenced by Arabic numerals within parentheses or brackets. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

Figure 1:
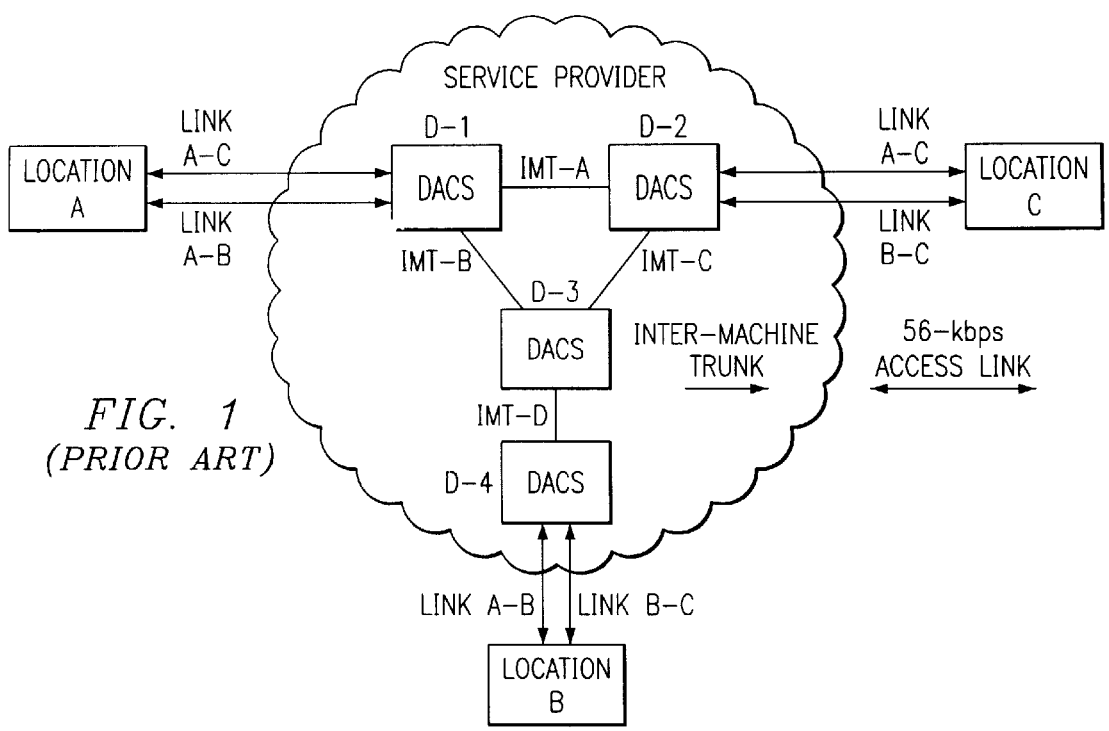
FIG. 1 illustrates a block diagram of a TDM-based private network, appropriately labeled "PRIOR ART."
Figure 2:
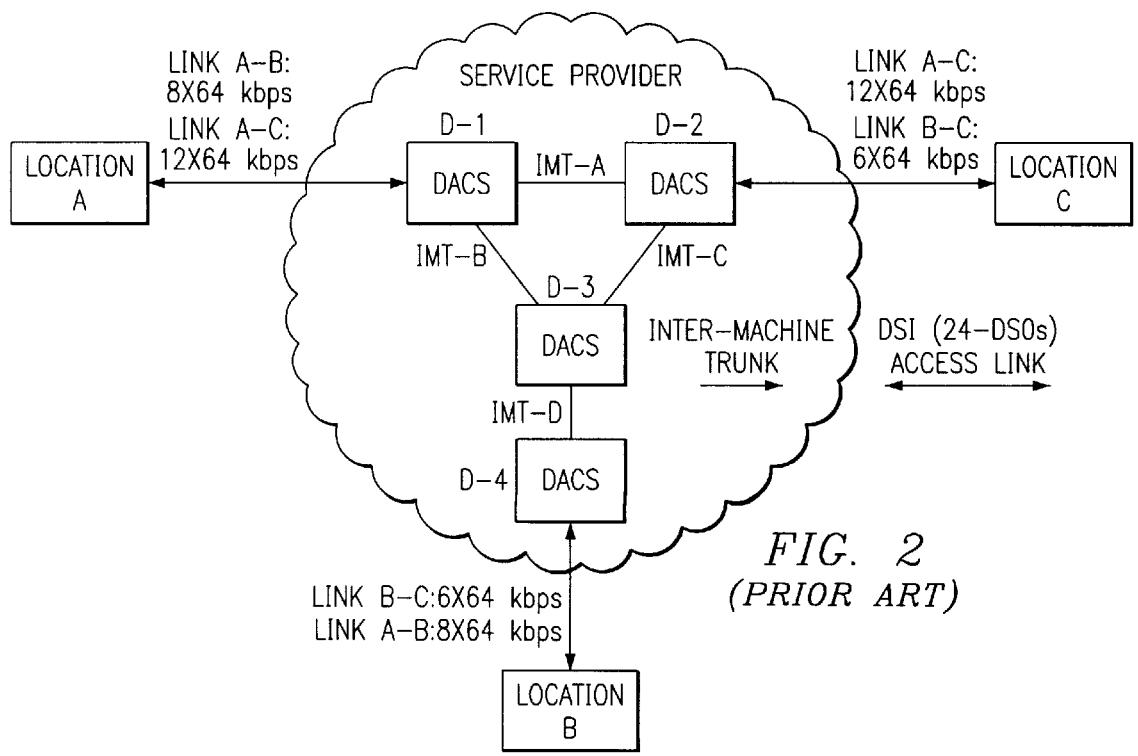
FIG. 2 illustrates a block diagram of another TDM-based :private network. appropriately labeled "PRIOR ART."
Figure 3:
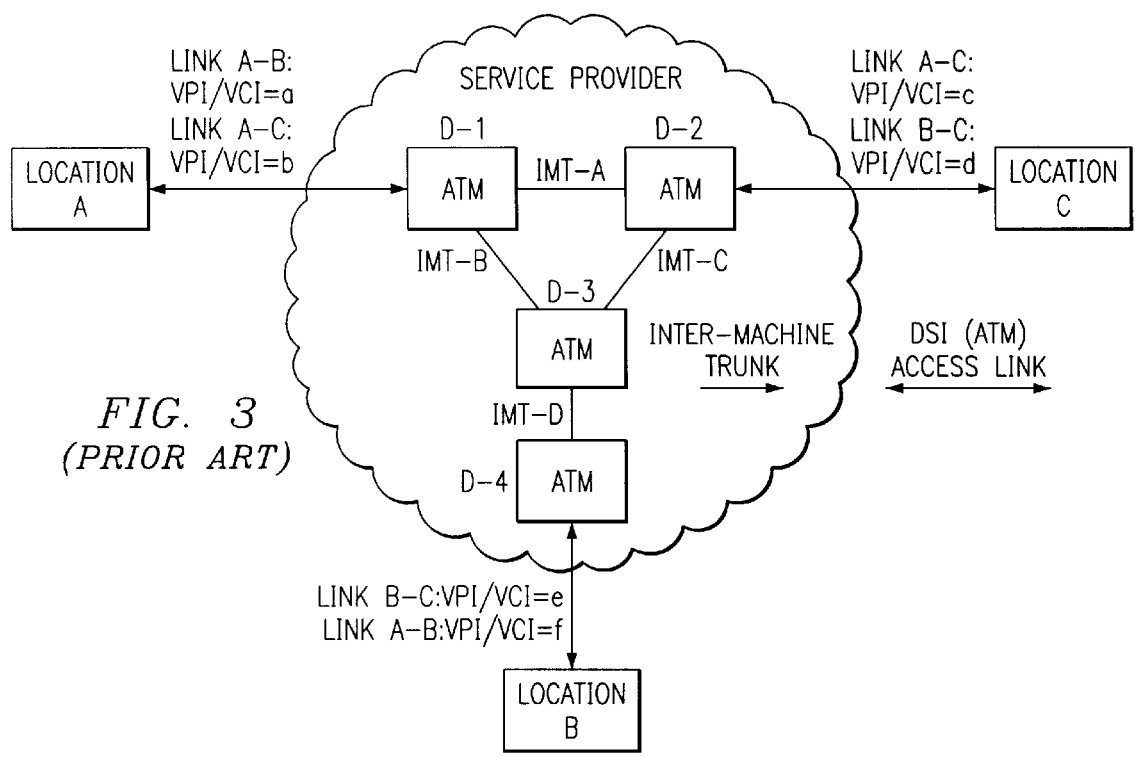
FIG. 3 illustrates a block diagram of an ATM-based private network, appropriately labeled "PRIOR ART."

The premise underlying ATM encapsulation is that a serial data stream can be segmented into cells. These cells are comprised of 48 byte (octet) blocks. For transmission over the physical layer (which could be DS1, DS3, SONET, ADSL, SDSL, etc.) a 5 octet header is added to make the transmission unit 53 octets in size. It is convenient to look at the arrangement in terms of functional layers as depicted in FIG. 4 which is a simplified view of the layered description provided in the literature (e.g. Ref. [1], FIG. 3, FIG. 6).

Figure 4:
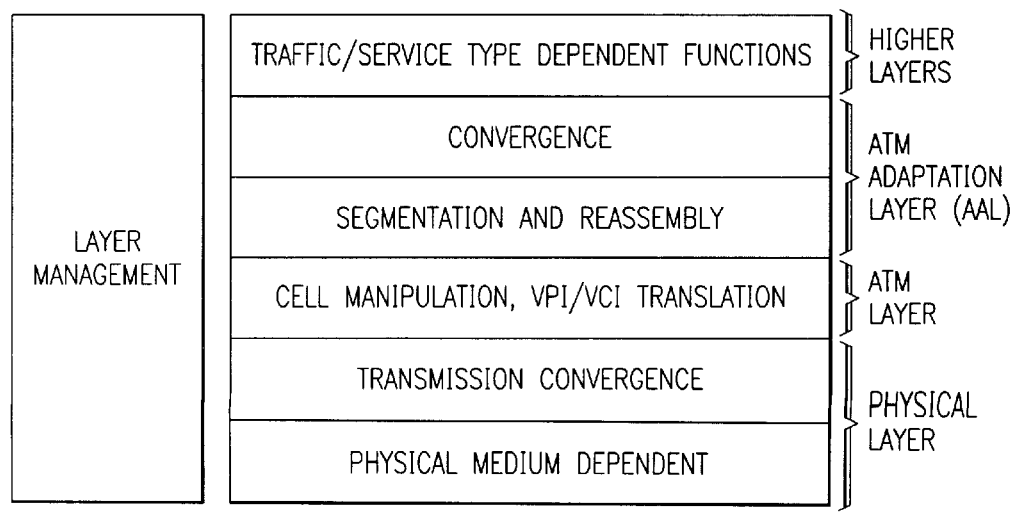
FIG. 4 illustrates a block diagram of ATM functions, appropriately labeled "PRIOR ART."

Referring to FIG. 4, the notion of "Higher Layers" refers to the manner in which information (data) is handled at the application layer. For example, the source of data may be computer generated, destined as a file transfer to another location (computer); the source of data may be a telephone/PBX as in a voice call between this and another location. These higher layers generate the data that need to be transported over the Network: The kind of data, or service required, could be time-critical, such as voice where an essentially continuous data rate must be maintained, or file transfers where real time is not so significant.

This data is presented to the ATM Adaptation Layer (AAL) for proper formatting into the 48 octet cells. The "Convergence sub-layer" aspect of the AAL refers to any particular actions that must be taken to match the data source and the method of transmission. The data is presented in the form of serial data or, equivalently, in the form of octets. Depending on the Service the formatting into 48 octet cells is done differently, with a different amount of the 48-octet cell payload being used for actual user data (see Ref. [1], FIG. 6, for example). For instance, the 48-octet assembly may include some additional overhead required to properly reassemble the actual user data bit-stream (octet-stream) at the receiver. Nevertheless, the ATM Adaptation Layer (AAL) provides the ATM layer information in the form of 48-octet cells (for each individual link) and, likewise, accepts 48-octets units (for each individual link). Thus the AAL includes the functions of segmentation and reassembly (SAR) in the outbound and inbound directions, respectively.

The ATM Layer comprises the functions associated with cell processing. This would include the generation/extraction of the 5-octet header, the insertion/translation of the appropriate VPI/VCI, generic flow control, and the multiplex/demultiplex operations. A VPI (virtual path identification) identifies an unidirectional transport of ATM cells belonging to a bundle of virtual channels. A VCI (virtual channel identification) describes an unidirectional transport of ATM cells.

The Physical Layer can be viewed as two sub-layers. The transmission convergence sublayer refers to the functions of mapping ATM cells (53-octet units) into a format suitable for transmission over the given physical medium (such as DS1, DS3, etc.). Likewise, in the inbound direction, cell delineation, whereby the 53-octet units are extracted from the received signal, is performed. The Physical Medium dependent sub-layer is where the transmit bit-stream is generated and inbound bit-stream extracted. Also, pulse wave-shapes appropriate for the physical medium are generated (outbound) or detected (inbound).

The method for measuring time delay and time delay variation involves the sending of specially marked cells that contain time-stamps. The notion of a time stamp is quite straightforward and is simple to implement.

Figure 5:
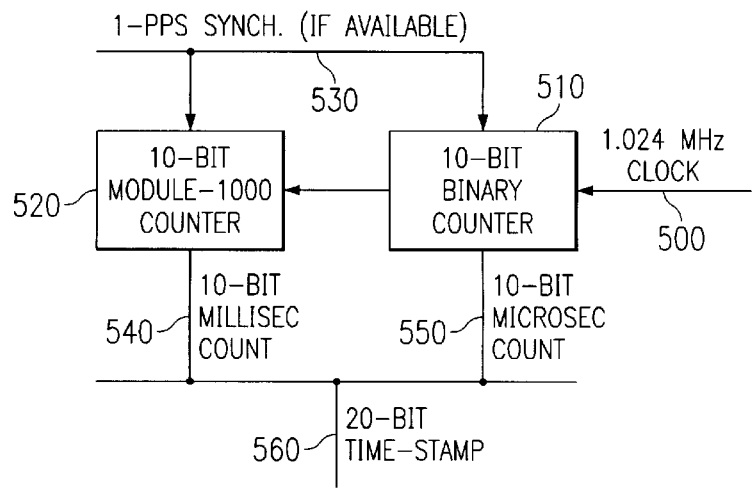
FIG. 5 illustrates a flow diagram of a time-stamp generation process, representing an embodiment of the invention.

Referring to FIG. 5, a 1.024 MHz clock signal 500 is coupled to a 10-bit binary counter 510. The 10-bit binary counter 510 is coupled to a 10-bit modulo-1000 counter 520. A 1-pps synchronization signal 530 is coupled to the 10-bit modulo-1000 counter 520 and to the 10-bit binary counter 510. The 10-bit modulo-1000 counter 520 is coupled to a 10-bit millisecond count 540. The 10-bit binary counter 510 is coupled to a 10-bit microsecond count 550. The 10-bit millisecond count 540 is coupled to a 20-bit time stamp 560. The 10-bit microsecond count 550 is coupled to the 20-bit time stamp 560.

Still referring to FIG. 5, the access multiplexer includes a counter driven by its local master clock. This master clock must be reasonably accurate or, preferably, synchronized in frequency to the Network time-base. For example, assume that the access multiplexer has available (internally) the 1.024 MHz clock signal 500. Assume that the counter is a 16-bit binary counter. Then each count represents a time interval of 0.977 $\mu$sec. (approximately 1 $\mu$sec) and the counter "roll-over" occurs every 65536 counts, or 64 msec. The value of the counter represents time modulo-64-msec. In a serially cascaded arrangement, the counter is split into two counters, the 10-bit binary counter 510 and the other the 10-bit modulo-1000 counter 520. Then the 10-bit binary counter 510 roll-over occurs every 1 msec and by using the roll-over as the count-enable for the modulo-1000 counter 520, the total arrangement rolls-over every 1 sec. The combined 20-bit value represents time modulo-1-sec. The latter arrangement is especially suitable if the access multiplexer has available a time-synchronization signal such as the 1 pps synchronization signal 530 (1 pulse-per-second) that is synchronized to absolute time (UTC or Universal Coordinated Time). Availability of a 1-pps synchronization signal 530 allows us to synchronize the dual-counter arrangement such that the roll-over occurs in a coordinated manner in all such multiplexers (wherever they may be). If a 1-pps signal is available, the time-stamp 560 is thus "absolute"; if such a 1-pps signal is not available then the time-stamp 560 is "relative".

Referring to FIG. 5, the availability of this counter value, or time-stamp, means that the arrival time of a cell can be recorded. Likewise, the time of creation of a cell can be recorded. The time-stamp 560, in the given example of counters, can be stored as a 3-octet number.

Clearly, a Time-Stamp counter can easily be modified to generate a Time-Stamp occupying 3 octets and have a much higher modulo-time, for example 16 seconds. The special cells used to transmit Time-Stamp information will be referred to as "TDV Cells". The contents of the 48-octet TDV Cell are described here.

First, there has to be some qualification that the cell is indeed a TDV Cell. For example, 2 (or more) octets with a special pattern can be used for this purpose. Second, the transmitter will assign a sequence number to the cell it is sending. For example, one octet will permit sequence numbering modulo-256 (the sequence number following 255 is 0). Third is the Time-Stamp that represents the "instant" that this cell is created (i.e., readied for transmission). Three octets suffice if the Time-Stamp scheme of FIG. 5 is employed. The combination of sequence number and Time-Stamp is 4 octets and is referred to as a Time-Stamp Unit. At the transmitter, the time-stamp is representative of the time-of-transmission of the cell. At the receiver, the Time Stamp Unit is modified such that the time-stamp is representative of the time-of-arrival of the cell.

Fourth, and this is crucial in the case of relative Time-Stamps, the transmitter returns the last Time-Stamp Unit that it received from the other end of the link (the far end access multiplexer).

The information as described so far utilizes 10 (2+4+4) octets of the available 48. Two octets for identification as a TDV Cell, 4 octets for the transmission Time-Stamp Unit, and 4 octets comprising the last received Time-Stamp unit (a transmission Time-Stamp unit originating at the far end access multiplexer modified such that the time-stamp is representative of the cell time-of-arrival). Additional useful information that could be accommodated in the remaining 38 octets will be discussed later.

Figure 6:
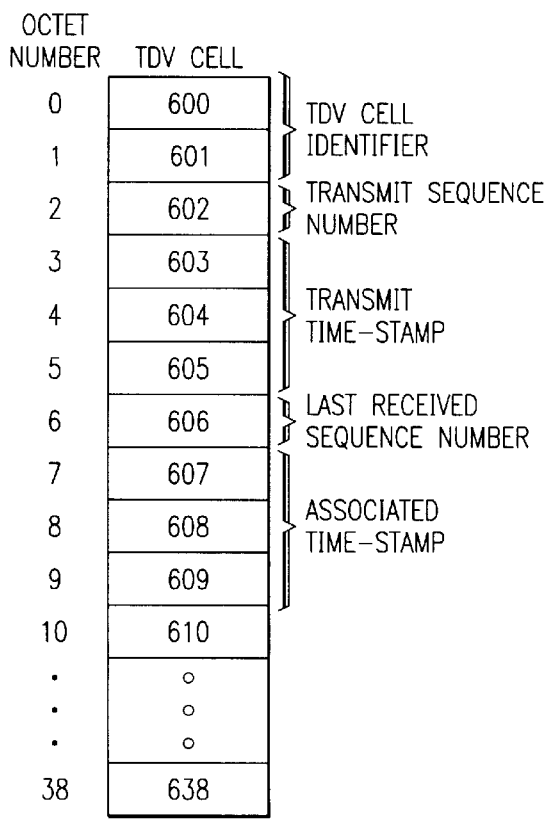
FIG. 6 illustrates a block diagram of the basic structure of a TDV Cell, representing an embodiment of the invention.

Referring to FIG. 6, the basic structure of a TDV Cell is depicted. An octet number 0 block 600 is coupled to an octet number 1 block 601. The octet number 1 block 601 is coupled to an octet number 2 block 602. The octet number 2 block 602 is coupled to an octet number 3 block 603. The octet number 3 block 603 is coupled to an octet number 4 block 604.

The octet number 4 block 604 is coupled to an octet number 5 block 605. The octet number 5 block 605 is coupled to an octet number 6 block 606. The octet number 6 block 606 is coupled to an octet number 7 block 607. The octet number 7 block 607 is coupled to an octet number 8 block 608. The octet number 8 block 608 is coupled to an octet number 9 block 609. The octet number 9 block 609 is coupled to a 38 octet block 610.

Still referring to FIG. 6, the octet number 0 block 600, and the octet number 1 block 601 can contain a TDV cell identifier. The octet number 2 block 602 can contain a transmit sequence number. The octet number 3 block 603, the octet number 4 block 604, and the octet number 5 block 605 can contain a transmit time-stamp. The octet number 6 block 606 can contain a last received sequence number. The octet number 7 block 607, the octet number 8 block 608 and the octet number 9 block 609 can contain an associated time-stamp (representative of time-of-arrival). The 38 octet block 610 can contain additional useful information.

The access multiplexer will routinely send TDV Cells to the distant end access multiplexer. To avoid confusion caused by the modulo-1-sec representation of time, the interval between TDV Cell transmissions should be less than 1 second (preferably less than 0.5 or even 0.25 seconds). Furthermore, the absolute time delay of the link should be less than 1 second. If these conditions cannot be met for some reason, then the Time-Stamp generation requires a higher "roll-over" or modulo-time. Since there is an adequate number of octets available in a cell, representation of a Time-Stamp using more than 3 octets is easily accommodated. However, we shall assume for this explanation that time is modulo-1-second and 3 octets are used for the Time-Stamp.

Based on the record of transmit time epoch and received time epoch, the access multiplexer can ascertain the time-delay variation over the link. If the two access multiplexers at the ends of the link (say A and B) are synchronized to UTC (absolute Time-Stamps) then the actual time delay over the link can be estimated.

The time-stamp information cell can be generated at a first access multiplexer (where it will include a transmittal time-stamp), transmitted to a second access multiplexer (where it may get a receive time-stamp), and then be re-transmitted to the first access multiplexer. In this case, the information contained in the cell arriving at the first access multiplexer would provide the original transmission time and the time of arrival at the second multiplexer.

Assuming that the local master clocks of the two access multiplexers are accurate, for example via synchronization of time-base with the Network time-base, then the Time-stamps generated at the same instant of time at the two ends will be offset by a constant value, say X, which is not known but is constant. If the two ends have UTC traceability, then we can assume that X is zero (or a known value). If the transmit (from A) time-stamp is $T_1$ and the receive (at B) time-stamp is $T_2$, then the difference $((T_{2-T_1}))$, where the difference is taken modulo-1-sec, is a measure of the time-delay across the link from A to B, offset by X. By keeping a record of such time-difference measurements, where each measurement has the same (unknown) offset, X, we can develop a histogram, or profile, of the time delay across the link from A to B. A similar operation is performed at the other end to gauge the delay characteristics of the link from B to A.

Assume we have made N measurements of this time delay, and denote these values by $\{x_k; k=0,1,\ldots,(N-1)\}$. The standard deviation of this set of numbers is a measure of the time-delay-variation (TDV) of the link from A to B. The average of these values is an estimate of the time-delay (on the average) of the link from A to B. In particular, $$\bar{x} = \frac{1}{N}\sum_{k=0}^{N-1} x_k = \text{average time-delay}$$

$$\sigma_{AB} = \sqrt{\frac{1}{N-1}\sum_{k=0}^{N-1}(x_k - \bar{x})^2} = \text{estimate of TDV (standard dev.)}$$

This estimate of average time-delay is useful when the two ends are UTC traceable. The estimate of time-delay variation is useful when the two end multiplexers have accurate master clocks (frequency).

Now suppose we have two PVCs between the same two end-points and we denote by $\{x_k\}$ the time-delay measurements on PVC #1 and by $\{y_k\}$ the time-delay measurements on PVC #2. Since the two PVCs have the same end-point access multiplexers, the fixed time-offset, X, discussed before, is the same for bot sets of measurements. We can determine a "worst-case" time-delay variation between the two PVCs by considering $$\Delta^{1,2}{}_{AB} = \max\{[\max\{x_k\}-\min\{y_k\}],[\max\{y_k\}-\min\{x_k\}]\}$$

If two (or more) PVCs are "bonded" together, this worst-case time-delay variation is useful for determining the size of the buffers required to re-sequence cells from a single stream that are "split" between the two (or more) PVCs.

If the access multiplexer at A never receives a TDV cell containing the time of reception at B of a particular cell with sequence number M, this would indicate that the TDV Cell from A to B did not appear at B or the corresponding TDV Cell from B did not reach A. Based on sequence numbers available it is not difficult to ascertain which direction had the trouble. A cell is lost if there is significant traffic congestion in the Network to the point that the Network is discarding cells, or a transmission error occurred, based on which the cell was discarded. In either case, the loss of cells is an indication of deteriorating quality of service.

For the method to have value, the TDV Cells must traverse exactly the same path as the user data over the Network. One way to ensure this is to map TDV Cells as well as the user-data cells into the same VPI/VCI. The disadvantage to this approach is that every cell, whether it contain user-data or is a TDV Cell, must reserve some portion of the 48-octet arrangement to identify it as such. However, the "tax" this imposes is not steep and the advantages of being able to monitor the permanent virtual circuit (PVC) would more than compensate for this reduction in bandwidth. Furthermore, since the TDV Cells occupy the same PVC anyway, this tax has minimal negative consequences.

An alternative method is to assign two VPI/VCI between the two end points and administratively assure that traffic for both PVCs traverse exactly the same ATM Switches and inter-machine trunks. Since the end points of both PVCs is the same, this administrative burden is minimal. In this method, the "tax" levied on user-data cells to distinguish them from TDV Cells is non-existent.

As mentioned above, there are an ample number of octets available in TDV Cells for other uses. One possible use is to ascertain the cell transfer rate being achieved over the particular PVC being monitored. In particular, the access multiplexer maintains a count of cells being transmitted over the PVC. This count can be modulo-N where N. is a large number, say 65536=$2^{16}$, so the count can be represented by a 16-bit unsigned integer and encapsulated in two octets.

The transmit access multiplexer includes the current cell count in each TDV Cell. The receiver can, from two consecutive TDV Cells, ascertain the number of cells that have been transmitted in the time interval between the transmission of the two cells as well as ascertain the time interval between the two cells from the two time-stamps. Assuming that TDV Cells are transmitted reasonably frequently (at least two TDV Cells in every N cells, preferably four or eight TDV Cells in every N cells), then the roll-over associated with the modulo-N numbering can be easily resolved, even if an occasional TDV Cell is lost in transit.

The nominal cell transfer rate is then easily computed as the number of cells transmitted divided by the time-interval.

In a simple scenario, we have a single PVC for a particular data channel. The data from the source is segmented into ATM payload units (48 octet assembly) and these are sent over the specified PVC. The ATM Network guarantees that these cells will be received in sequence. Exceptions occur when cells are lost or discarded (because of HEC errors). But the notion of first-in first-out is retained. In a more complex scenario, a particular data channel is transported over the ATM Network using several PVCs. The channel data rate is the aggregate data rate of the PVCs that are "bonded" together less some bandwidth used for overhead. These PVCs may have different. characteristics (different delay, different delay-variation, different cell rate, etc.) In such a scenario, some overhead is used to ensure that at the receiver, received cells can be rearranged to achieve the notion of first-in first-out. This is the aim of "bonding". Whereas bonding can be achieved at higher layers (e.g. Layer 3), the scheme described here addresses bonding at the ATM layer (Layer 2).

ATM encapsulation provides a natural method for bonding multiple PVCs. One approach is discussed here and several variations can be discerned. If multiple lower speed channels are to work together to provide an aggregate transfer rate that is (roughly) the sum of the transfer rates of the constituent channels, a fundamental issue is the need to keep the traffic data "in sequence". In order to achieve the sequencing we can use ATM encapsulation.

Figure 7:
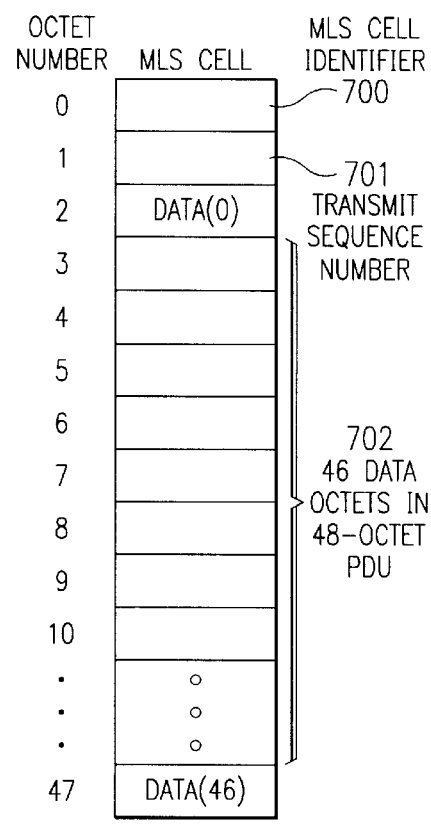
FIG. 7 illustrates a block diagram of the structure of an MLS cell, representing an embodiment of the invention.

Referring to FIG. 7, a block diagram of the structure of an MLS cell is depicted. An MLS cell identifier octet 700 is coupled to a transmit sequence number octet 701. The transmit sequence number octet 701 is coupled to a set of 46 data octets 702.

Still referring to FIG. 7, the cells formatted for use in bonded scenarios are called "MLS Cells". An MLS Cell utilizes part of the 48-octet ATM payload for identifying itself as an MLS Cell and providing a sequence number for the cell. We assume here that 2 octets are reserved for these functions. Clearly the MLS cell identifier octet 700 can provide more information than just that it is an MLS Cell. By reserving the transmit sequence number octet 701 for cell sequence identification we are restricting ourselves to numbering cells modulo-256. Some bits of the MLS cell identifier octet 700 may be used to increase the modulus if necessary. However, in this scenario, only 46 octets of the ATM cell are used to transport actual traffic data. The so-called "cell-tax" associated with ATM is increased from 5 octets per 48 octets of data to 7 octets per 46 octets of data.

When we have multiple PVCs linking two locations, it is possible to bind them together, resulting in a single logical channel whose data rate is roughly the aggregate of the data rates supported by the individual PVCs. Cells from the principal channel are transported over the multiple PVCs and the use of sequence numbers embedded in the MLS Cells allows the receiver to recreate the original (high-speed) cell stream representative of the single logical channel. It is also possible to increase the "cell-tax" by creating MLS cells that contain less than 46, say 44, actual traffic octets, then the 4 added octets can contain the sequence number or an equivalent set of information that further simplifies the recreation, or reassembly, of the high-speed cell stream at the receiver.

Figure 8:
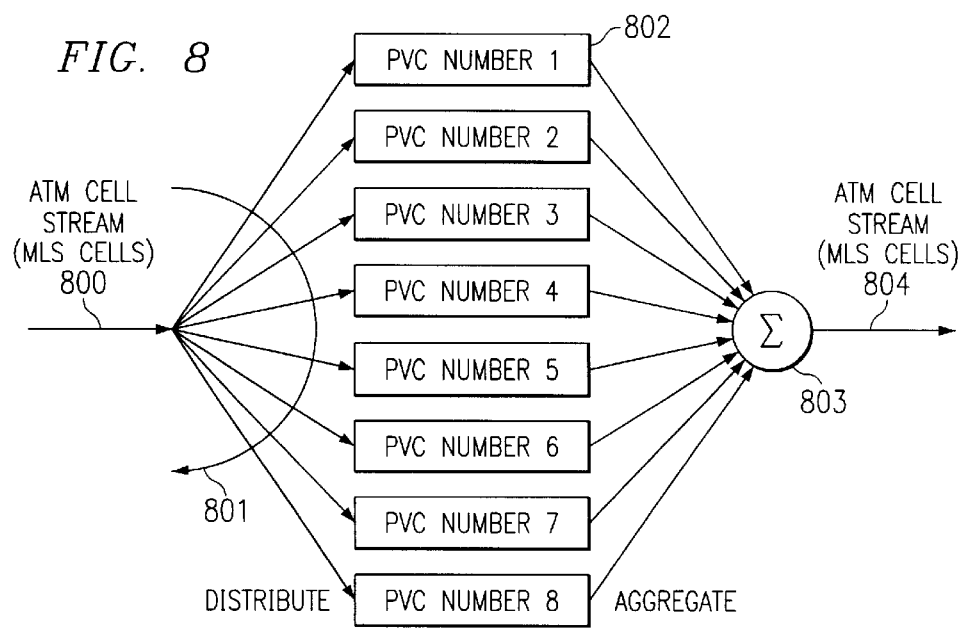
FIG. 8 illustrates a block diagram of the distribution and aggregation of MLS cells, representing an embodiment of the invention.

Referring to FIG. 8, a block diagram of the distribution and aggregation of MLS cells is depicted. An ATM cell input stream 800 is coupled to a distributing agent 801. The distributing agent 801 is coupled to a set of eight permanent virtual circuits 802. The set of eight permanent virtual circuits 802 is coupled to an aggregating agent 803. The aggregating agent 803 is coupled to an ATM cell output stream 804.

Still referring to FIG. 8, the notion of bonding is to transport the ATM cell input stream over multiple PVCs. That is, the ATM network appears, logically, to be eight (in the example shown) distinct channels, each with its own parameters (delay, cell rate, etc.), represented by the set of eight permanent virtual circuits 802. They originate at a transmitter (source) and terminate at a receiver (sink). The transmitter organizes the data to be transmitted in the form of MLS Cells, with each cell having a sequence number, modulo-256 (or larger), and we assume that the worst-case cross-PVC delay variation is much less than 256 cells. The transmitter distributes the cells over the eight PVCs (in a manner described later). Since the ATM Network ensures that each PVC operates in a first-in first-out manner (exceptions are when cells are lost because of errors) the receiver can re-sequence the cells using the available sequence numbers. Logically, the ATM Network appears as though it is a single stream operating at the aggregate cell rate.

Aggregation of cells (at the receiver) to form the single composite stream is quite straightforward. For example, the aggregate agent 803 can include a double-buffer arrangement. While one buffer is being filled, using the cell sequence numbers to achieve the re-ordering, the second buffer is being read out. The size of each of the buffers does not need to be greater than 256 (the modulo number) but having larger buffers provides means for "smoothing" out the delivery of cells in the composite stream.

The distribution of cells over the multiple PVCs can be achieved in two ways by the distribute agent 801. These two ways are called "push" and "pull" and are described below. The principal distinction between the two approaches to distribution relates to the manner in which data (cells) is buffered.

In the pull distribution method, the source data is converted to ATM cells (actually MLS Cells) and buffered in a first-in-first-out (FIFO) buffer. The size of the buffer must be large enough such that there is no overflow when the incoming data rate is greater than the effective data rate of the aggregate bonded PVCs. For example, the aggregate data rate over the ATM Network may be 10 Mbps whereas the source is providing data at a line rate of DS3 (about 45 Mbps). It is incumbent on the data source to ensure that the average information data rate is no more than 10 Mbps. Thus even though the line rate is large, the source must introduce "filler units" such as flags in the case of HDLC or null cells if already in ATM format, to keep the average (usable, or information) data rate less than 10 Mbps. However, there may be short periods of time where the rate is greater than 10 Mbps and this would cause the buffer to "fill" since more cells enter than leave. The size of the buffer determines how long these "short periods" of time are. A large buffer size would permit long periods of sustained high-speed information delivery from the source (followed, obviously, by periods where the rate is less than 10 Mbps in order that the average be equal to 10 Mbps).

Each PVC is implemented on a physical link and requires its own (FIFO) buffer to allow for short-term rate differences between the transmission capability of the link and the availability of cells to transport over the link. These buffers are usually quite small. With FIFOs, it is customary to try to keep the FIFO "half-full" (or any other pre-determined fraction full). When the fill level drops below one-half, the PVC is ready to accept another cell for transmission. In this situation it "pulls" one cell from the source FIFO. In the event that two PVCs "pull"(or request for) cells simultaneously, a master scheduler can prioritize which PVC is serviced first. If no information cell is available (if the source FIFO is empty or perilously close to being empty), a fill-in cell or a management cell or a TDV cell can be inserted in its place.

Note that the distribution of information cells is done on an "as needed" basis and there is no particular pattern enforced. This is in contrast with conventional inverse multiplexing techniques that use a rigid "round-robin" scheme for distributing cells between the multiple channels.

In the push distribution method, the burden of buffering the source data (cells) is placed on the FIFOs of the multiple PVCs. Each PVC maintains its own FIFO, the size of which is commensurate with the cell rate that the PVC can sustain. The combined total buffer size of the PVC FIFOs must be adequate to smooth out rate differences between the source and the aggregate of the bonded PVCs (similar to the input buffer size in the pull distribution method).

For each available input cell (MLS Cell containing source information data) a decision is made as to which FIFO is the "most empty" (of the multiple PVCs). The cell is written into the corresponding FIFO. On a routine basis TDV Cells and/or management cells are introduced into the stream for each PVC. Fill in cells are used (by the physical link) if no cells are available for transmission.

Again, note that the distribution of information cells is done on an "as needed" (or "as available") basis and there is no particular pattern enforced, which is in contrast with conventional inverse multiplexing techniques that use a rigid "round-robin" scheme for distributing cells between the multiple channels. In actuality, a combination "push-pull" arrangement may be most efficacious. For convenience the direction towards the ATM network is called "transmit" and the other direction is called "receive". Furthermore, it can be assumed, for convenience, that the transmission medium used to connect to the Network is DSL though it could be one of a variety of other methods such as T1, T3, or digital radio, or even a combination of two or more of these methods.

Figure 9:
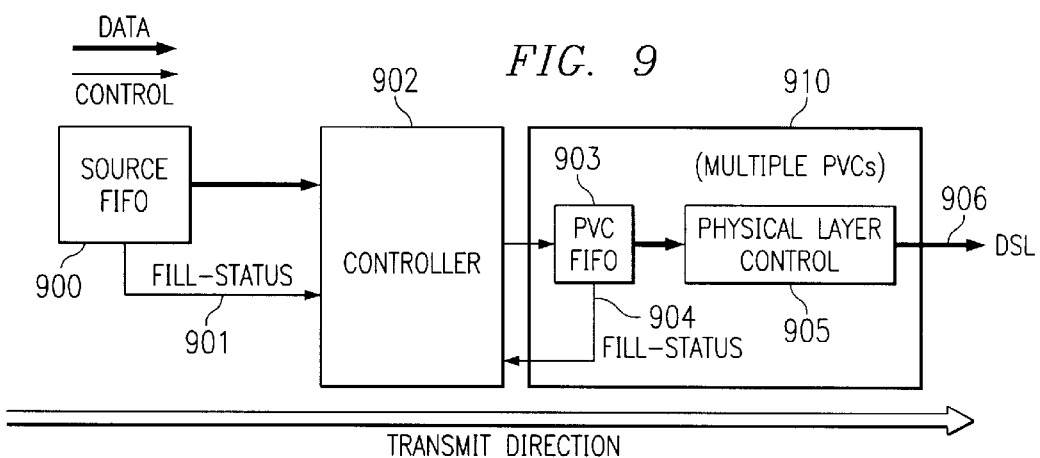
FIG. 9 illustrates a block diagram of a push-pull transmit process, representing an embodiment of the invention.

Referring to FIG. 9, a block diagram of a push-pull transmit process is depicted. A source FIFO buffer 900 is coupled to a controller 902 and to a source fill-status line 901. The source fill-status line 901 is coupled to the controller 902. The controller 902 is coupled to a PVC FIFO buffer 903. The PVC FIFO buffer 903 is coupled to a PVC fill-status line 904 and to a physical layer controller 905. The PVC fill-status line 904 is coupled to the controller 902. The physical layer controller 905 is coupled to a DSL pipe 906. For a plurality of PVC lines, there may be an equal number of each of the elements included in the PVC block 910.

Still referring to FIG. 9, only one PVC is shown and the others implied. Further, though it may appear that the DSL pipe 906 has a single PVC, it is possible that multiple PVCs are supported by a single DSL pipe. However, the reverse is generally not true. A single PVC may not be distributed over multiple DSL pipes, except in very special situations such as in G.SHDSL where two DSL pipes are hardware combined to appear as one DSL pipe of twice the bit-rate.

Referring to FIG. 9, each PVC has associated with it a PVC FIFO buffer 903, typically 2 to 8 cells deep. A FIFO arrangement is necessary to smooth out the requirements of the physical layer. The DSL pipe 906 is usually a "smooth" bit stream whereas the data is provided in the form of ATM cells in somewhat "bursty" manner. The DSL pipe 906 has associated with it the physical layer control 905 that does the appropriate formatting for transmitting ATM cells over the actual DSL pipe 906. The state of the PVC FIFO buffer 903 (i.e., how full or empty it is) is represented by the PCV fill-status line 904 and is available to the controller 902. Likewise, the state of the source FIFO buffer 900 is represented by the source fill-status line 901 and is associated with the information data channel (i.e., the source) is available to the controller 902. The depth of the source FIFO buffer 900 is typically quite large, especially if the peak transfer rate is much higher than the average transfer rate. If the PVC FIFO 903 is ever empty, the physical layer controller 905 will introduce a null cell (as a fill-in unit). If this feature is not available, then the controller 902 is responsible for inserting the necessary fill-in cells (null cells, TDV Cells, or management cells).

Referring to FIG. 9, the principal function of the controller 902 is to allocate cells from the source FIFO buffer 900 across the multiple PVCs. A second function is to insert TDV cells, management cells, and fill-in cells. A third function is to add in the 5-octet header, providing the appropriate VPI/VCI and other header bits. The goal of the load-balancing algorithm is to maintain all FIFOs at "half-full" on the average. Further, the source FIFO buffer 900 is monitored to ascertain whether congestion control steps must be taken. These steps must be enforced to prevent the source FIFO buffer 900 from overflowing.

Still referring to FIG. 9, associated with each FIFO are two thresholds related to the fill-status. We shall refer to these thresholds as $T_{empty}$ and $T_{full}$. These thresholds may be different, numerically, for each of the different FIFOs. In the case of the PVC FIFO buffer 903, a fill-status exceeding $T_{full}$ indicates that the controller 902 cannot provide a new cell (the PVC is effectively unavailable at this time) whereas a fill-status less than $T_{empty}$ indicates that the PVC FIFO buffer 903 needs a new cell; a fill-status between the two thresholds indicates that the controller 902 may provide a new cell (if available). In the case of the source FIFO buffer 900, a fill-status exceeding $T_{full}$ means that the controller 902 must transfer a cell from the source FIFO buffer 900 to one of the PVC FIFOs (such as the PVC FIFO buffer 903) or, if all the PVC FIFOs are unavailable, initiate congestion control mechanisms. If the fill-status of the source FIFO buffer 900 drops below $T_{empty}$ it means that (on a short term basis) the source data rate is less than the aggregate provided by the PVCs and fill-in cells must be inserted in the transmit direction.

Figure 10:
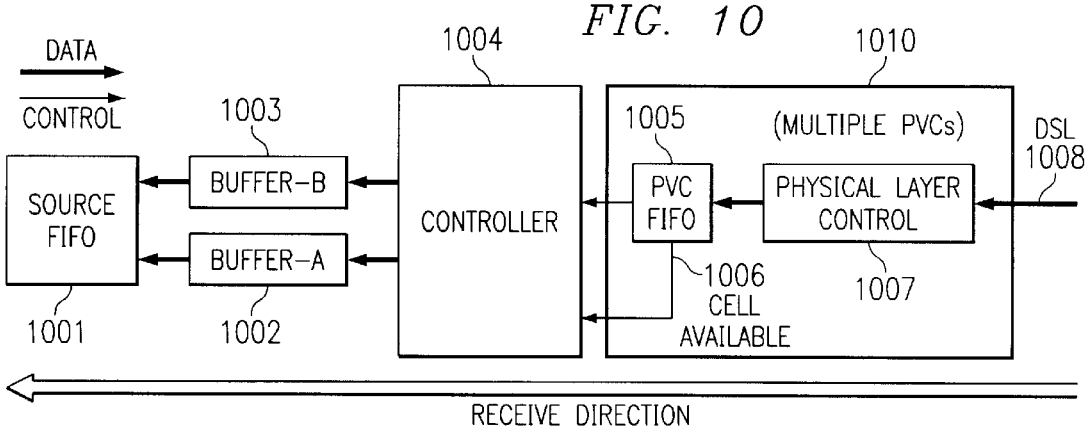
FIG. 10 illustrates a block diagram of a push-pull receive process, representing an embodiment of the invention.

Referring to FIG. 10, a block diagram of a push-pull receive process is depicted. A DSL pipe 1008 is coupled to a physical layer control 1007. The physical layer control 1007 is coupled to a PVC FIFO buffer 1005. The PVC FIFO buffer 1005 is coupled to a controller 1004 and to a cell available line 1006. The cell available line 1006 is coupled to the controller 1004. For a plurality of PVC lines, there may be an equal number of each of the elements included in the PVC block 1010.

Still referring to FIG. 10, the controller 1004 is coupled to a buffer-A 1002 and to a buffer-B 1003. The buffer-A 1002 is coupled to a source FIFO buffer 1001. The buffer-B is coupled to the source FIFO buffer 1001.

Referring to FIG. 10, note that the reverse process of distribution, namely aggregation, follows a similar data flow pattern as the one depicted in FIG. 9. Again, the DSL pipe 1008 has a PVC FIFO buffer 1005 into which the physical layer controller 1007 writes the incoming cell (for that particular PVC). It is likely that all cells are written into the PVC FIFO buffer 1005 and the controller 1004 decides, based on the VPI/VCI in the header, which PVC it belongs to. Nevertheless, the controller 1004 reads all cells for all the PVCs in the aggregate and, for each cell, using the sequence number as a pointer, writes the cell into a double buffer arrangement. When the PVC FIFO buffer 1005 is full, it is transferred to the source FIFO buffer 1001 (receive). A separate entity reads out the source FIFO buffer 1001 (receive) to generate the output data stream in a smooth manner.

Still referring to FIG. 10, the operation of the double buffer arrangement is described here. The buffer size is chosen to be equal to N, the range of sequence numbers used. Thus both buffer-A 1002 and buffer-B 1003 have storage for N cells and these storage locations (in blocks of the cell size) can be addressed using the sequence numbers as pointers. Each block location has associated with it a flag, indicating whether it has been written into or not. One of the buffers, the one most recently read out (and "cleared") is designated as "next" and the other ("older") buffer is designated as "current".

Referring to FIG. 10, when the controller 1004 receives a cell with sequence number k, say, it examines the flag associated with block-location k in the current buffer. If the flag is empty, the cell is written into that block-location and the flag set as full. If the current buffer flag is full, then the cell is written into the next buffer and the corresponding flag set as full. If the next buffer flag was full prior to this operation, then an error condition is indicated and a suitable action is described later. When all N flags of the current buffer are full, the entire buffer is moved into the source FIFO buffer 1001, the buffer is cleared and is designated as next whereas the other buffer's designation is changed to current.

Referring to FIG. 10, if the error condition wherein the flags for block location k are full in both the current and next buffers occurs, then two possibilities are indicated. One is that N, the range of sequence numbers, is not large enough. We assume that at the time of provisioning the bonded channel that the largest delay variation was taken into account and so we ignore this as a likely possibility. The second possibility, and the more likely one, is one of erroneous transmission. Erroneous transmission could result in, for example, an undetected transmission error in the network caused a bit-error that altered the sequence number. Erroneous transmission could result in, for example, a detected transmission error that caused a cell to be discarded. In either case the current buffer is transferred to the source FIFO buffer 1001 (regardless of the flag situation), the flags cleared except for block-location k, the cell written into that location, and what was the next buffer becomes the current buffer. The transmission error cannot be recovered from and it is incumbent on the Source equipment to take adequate measures to deal with the error.

If the source data is provided in ATM format to begin with, then two possibilities arise for conversion into the MLS format. One is to extract the data content from the incoming ATM cell stream (re-assembly), for which the nature of the stream needs to be known (AAL-1, AAL-2 AAL-3/4, AAL-5, etc.) and re-segment the data into the MLS format. The second, and probably better method, is to treat the incoming ATM cells as 48-octet data units. Then 46 such cells can be mapped into 48 MLS Cells (or 23 input cells map into 24 MLS cells). At the receiver the reverse process is accomplished. Note that each distinct VPI/VCI in the incoming ATM source stream qualifies as a distinct (and independent) channel.

Figure 11:
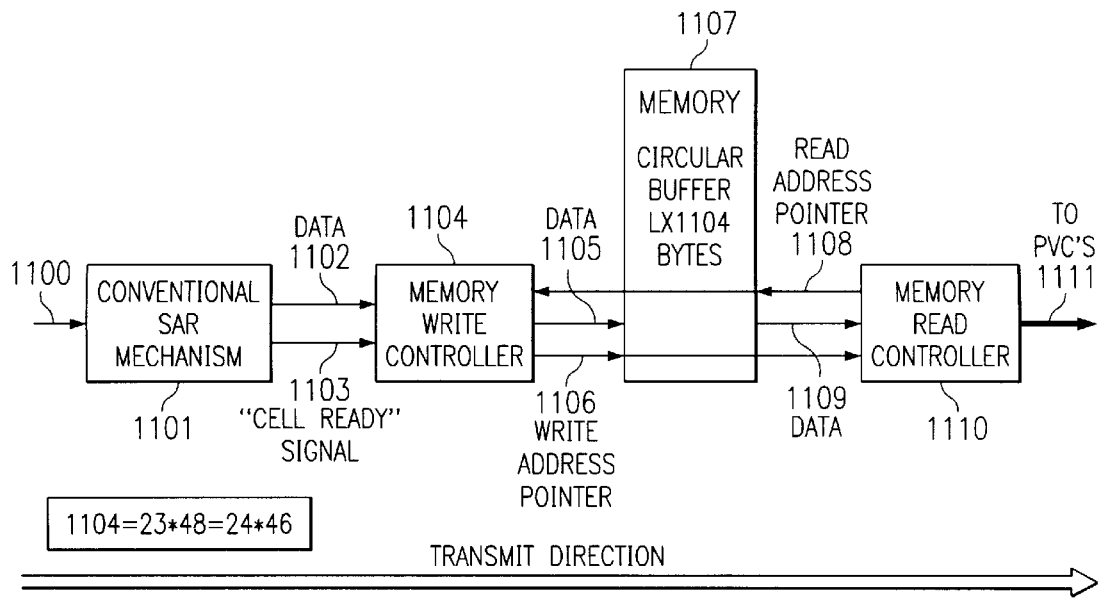
FIG. 11 illustrates a block diagram of an MLSAR transmit process, representing an embodiment of the invention.

Referring to FIG. 11, a block diagram of an MLSAR transmit process is depicted. The scenario assumes that there is a high-speed interface, such as DS3 or even Ethernet. The direction of data flow is from the high-speed (local) device towards the ATM network. We assume that conventional means are used to format the local incoming data into ATM cells (48 octet assemblies).

Still referring to FIG. 11, an input data flow 1100 is coupled to a conventional SAR mechanism 1101. The conventional SAR mechanism 1101 is coupled to a SAR data line 1102 and to a cell read signal line 1103. The SAR data line 1102 and the cell read signal line 1103 are coupled to a memory write controller 1104. The memory write controller 1104 is coupled to a memory write controller data line 1105 and to a write address pointer 1106. The memory write controller data line 1105 and the write address pointer 1106 are coupled to a buffer memory 1107. The write address pointer 1106 is coupled to a memory read controller 1110. The buffer memory 1107 is coupled to a memory data line 1109. The memory data line 1109 is coupled to the memory read controller 1110. The memory read controller is coupled to PVCs 1111 and to a read address pointer 1108. The read address pointer 1108 is coupled to the buffer memory 1107 and to the memory write controller 1104.

The principle underlying FIG. 11 is that whereas each cell from a conventional segmentation and reassembly (SAR) mechanism produces cells that are comprised of 48 octets, the MLSAR format calls out for 46 octets (plus two octets for identification and sequence numbering). We use the buffer memory 1107 between the conventional SAR mechanism 1101 and the link to the actual PVCs 1111 (actually the PVC control mechanism). The buffer memory 1107 can include a circular buffer memory. A convenient size for the buffer memory 1107, organized as a circular buffer, is 1104=23×48=24×46 bytes. That is, since 23 incoming cells comprise 1104 octets, and 24 outgoing cells comprise 1104 octets, a buffer size of 1104 octets (bytes) is akin to the least common multiple. The buffer can be made L×1104 octets in size, where L is an integer, and in this situation can provide a buffer between the incoming and outgoing directions to smooth out short-term variations in cell rate. That is, the circular buffer can play the role of "double buffer" or "Source FIFO".

Still referring to FIG. 11, when an incoming cell is ready, the memory write controller 1104 operates. It must write the 48 octets into the buffer memory 1107. The write address pointer 1106 determines the address in the buffer memory 1107 where a byte is written. Following the write operation of each octet, the write address pointer 1106 is incremented in a modulo-(L×1104) manner. That is, the lowest address occurs immediately after the highest address, giving the block of memory the characteristic of a circular buffer. All 48 octets are thus stored in the buffer memory 1107. The memory write controller 1104 also can detect an error condition if the write address pointer 1106 "overtakes" the read address pointer 1108. This is an indication that either the buffer size is not large enough to smooth out rate variations, or that the incoming cell rate is greater than the outgoing cell rate.

Referring to FIG. 11, to explain the action of the read controller, we shall assume that the "pull" arrangement is in effect. That is, if any of the PVC controllers is ready to send a cell in the outbound direction, it will request the memory read controller 1110 for a cell. The memory read controller 1110 then checks to see if the read address pointer 1108 is close to the write address pointer 1106. If the write address pointer 1106 is less than 46 octets "ahead" of the read address pointer 1108 (with arithmetic done modulo-(L× 1104)), the read address pointer 1108 returns a status message saying "no cell available". Otherwise, the memory read controller 1110 reads out 46 octets, incrementing the read address pointer 1108 modulo-(L×1104) for each octet read out of memory. The sequence number is incremented modulo-255 (we will mention later an alternative choice for the range of sequence numbers) or modulo-N where N is the chosen range of sequence numbers, and this sequence number (one octet) plus the MLSAR identifier (one octet) are appended to the 46 octet group from the buffer memory 1107 to make up the 48 octet assembly expected by the PVCs 1111 (PVC controller). This unit is passed along together with the status indication of "cell provided". The PVCs 1111 (PVC controller) will append the 5-octet header with the appropriate VPI/VCI identifiers for transmission over the PVC (i.e. the ATM network).

Considering the size of the circular buffer is a multiple of 24, making the sequence number range equal to a multiple of 24 can be advantageous. More generally, making the sequence number range equal to a multiple of a common denominator with the circular buffer can be advantageous.

Figure 12:
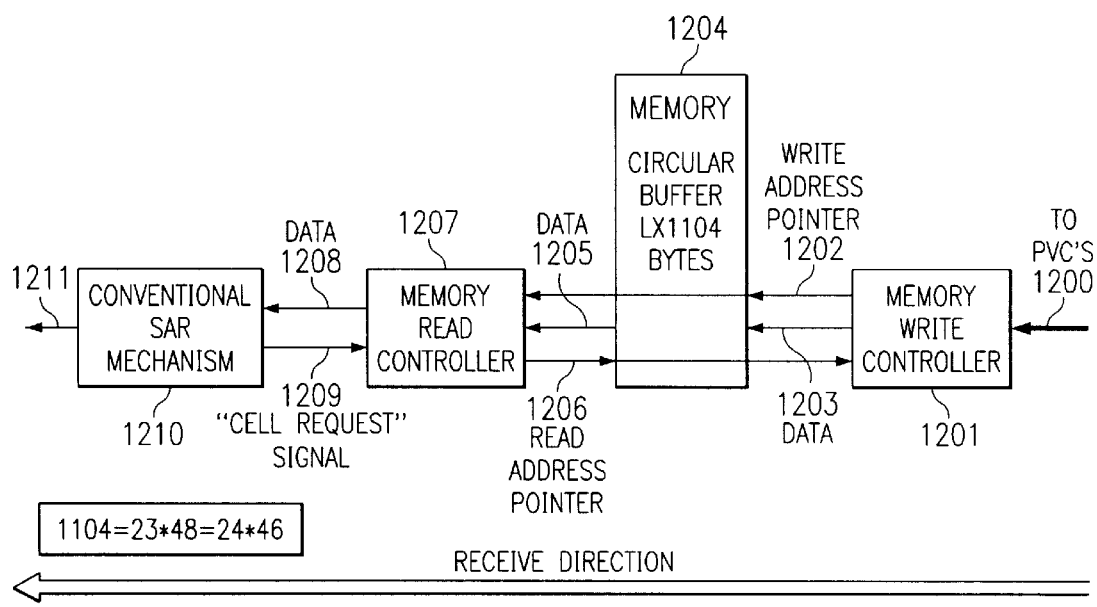
FIG. 12 illustrates a block diagram of an MLSAR receive process, representing an embodiment of the invention.

Referring to FIG. 12, a block diagram of an MLSAR receive process is depicted. A similar approach can be described for the "receive" direction, namely the direction from the network to the local data equipment. Note that the size of the buffer, namely the parameter "L", can be different for the two directions of transmission. Again, we assume that a conventional SAR mechanism is employed for handling the format of the local data interface.

Still referring to FIG. 12, an input from PVCs 1200 is coupled to a memory write controller 1201. The memory write controller 1201 is coupled to a write address pointer 1202 and to a memory write data line 1203. The write address pointer 1202 and the memory write data line 1203 are coupled to a buffer memory 1204. The buffer memory 1204 is coupled to a buffer memory data line 1205. The buffer memory data line 1205 is coupled to a memory read controller 1207. The memory read controller 1207 is coupled to the write address pointer 1202 and to a read address pointer 1206. The read address pointer 1206 is coupled to the buffer memory 1204. The memory read controller 1207 is coupled to a memory read data line 1208. The memory read data line 1208 is coupled to a conventional SAR mechanism 1210. The conventional SAR mechanism 1210 is coupled to a cell request signal 1209 and to an output signal 1211. The cell request signal 1209 is coupled to the memory read controller 1207.

Referring to FIG. 12, in the receive direction, the PVCs 1200 (PVC controller) will "push" a cell for the memory write controller 1201 to enter into the buffer memory 1204, which can include a circular buffer memory. In the receive direction, since cells are coming over diverse PVCs 1200, there may be an "out-of-order" situation and it is the function of the memory write controller 1201 to resolve these out-of-order situations using the sequence number. Because of transmission problems some cells may be lost. The memory write controller 1201 is not expected to recover the lost data but must ensure that such errors do not have a lasting effect. In extreme cases, there may be transmission errors that cause the sequence number to be flawed. Again, the memory write controller 1207 is not expected to "correct" the error but must ensure that such an error does not have a lasting effect.

Still referring to FIG. 12, suppose the range of sequence numbers was N=24n (a multiple of 24, as suggested above). The memory write controller 1201 partitions the buffer memory 1204 into logical "pages" of size n 46 24 octets. The buffer memory 1204 thus is comprised of (L/n)=m pages. The write address pointer 1202 represents the top address of a page that has been filled. Suppose $A_0, A_1, A_2, \ldots A_{(m-1)}$, represent the starting address of the pages in the buffer memory 1204 and, for convenience the name of the page as well. At any point in time, the memory write controller 1201 will be writing octets into a page, $A_k$, and possibly also $A_{(k+1)}$. The next page in line is $A_{(k+2)}$. (Since there are m pages in the buffer memory 1204, the index arithmetic is done modulo-m). The value of the write address pointer 1202 will be WP=$(A_k-1)$.

Referring to FIG. 12, when a cell is "pushed" onto the memory write controller 1201, it examines the sequence number, say $S_{new}$. Then the 46 payload octets must be written into the buffer memory 1204. Suppose the previous cell received had a sequence number $S_{old}$, the last octet (the 46-th octet of the last received cell) written into the buffer memory 1204 would have been either at the address $A_{last}=(A_k+46\ S_{old}+45)$ or at address $A_{last}=(A_{(k+1)}+46\ S_{old}+45)$. The just received cell must be written into the buffer memory 1204 starting with an address that is either:

($A_k$+46 $S_{new}$) OR b) ($A_{(k+1)}$+46 $S_{new}$) OR c) ($A_{(k+2)}$+46 $S_{new}$).

The chosen address is the one closest to $A_{last}$. If the choice is c), then page $A_k$ is deemed full, $A_{(k+1)}$ and $A_{(k+2)}$ then take on the role of $A_k$ and $A_{(k+1)}$, respectively. In this manner the received cells are written into the buffer memory 1204 in the correct sequence and transmission errors will not have a lasting effect. This is provided that the page size (N cells) is greater than the maximum cross-PVC time-delay-variation (measured in cells) across the multiplicity of PVCs that are being bonded together.

Referring to FIG. 12, the memory read controller 1207 operates in much the same way as the memory read controller 1207 for the transmit direction operates. When the conventional SAR mechanism 1210 requests a cell ("pull"), the memory read controller 1207 checks if the read address pointer 1206 can increment by 48 octets without overtaking the memory write pointer. If overtaking is possible, then a response of "Cell Unavailable" is returned to the conventional SAR mechanism 1210 (it is assumed that the SAR mechanism has a reasonably large FIFO to account for occasional Cell Unavailable situations). If 48 octets are available, the memory read controller 1207 takes these out of the memory and passes the 48-octet cell to the conventional SAR mechanism 1210 as well as does the necessary incrementing of the read address pointer 1206.

The context of the invention can include asymmetric transfer mode network characterization. The context of the invention can also multi-link segmentation and reassembly for bonding multiple permanent virtual circuits in an inverse multiplexing arrangement.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

Practical Applications of the Invention

A practical application of the invention that has value within the technological arts is multi-link segmentation and reassembly for bonding multiple permanent virtual circuits in an inverse multiplexing arrangement. There are virtually innumerable uses for the invention, all of which need not be detailed here.

Advantages of the Invention

Multi-link segmentation and reassembly for bonding multiple permanent virtual circuits in an inverse multiplexing arrangement, representing an embodiment of the invention, can be cost effective and advantageous for at least the following reasons. The invention can provide statistically significant performance data relating to the host ATM system, as well as specific routing configurations thereof. The invention improves quality and/or reduces costs compared to previous approaches.

All the disclosed embodiments of the invention disclosed herein can be made and used without undue experimentation in light of the disclosure. Although the best mode of carrying out the invention contemplated by the inventors is disclosed, practice of the invention is not limited thereto. Accordingly, it will be appreciated by those skilled in the art that the invention may be practiced otherwise than as specifically described herein. Further, the individual components need not be combined in the disclosed configurations, but could be combined in virtually any configuration.

Further, although the multi-link segmentation and reassembly for bonding multiple permanent virtual circuits in an inverse multiplexing arrangement described herein can be a separate module, it will be manifest that the time-delay measurements, time-delay variance measurements and cell transfer rate measurements in asymmetric transfer mode networks may be integrated into the system with which they are associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

[1] Introduction to ATM Networking, Walter J. Goralski, McGraw-Hill Series on Computer Communications, 1995. ISBN 0-07-024043-4.

What is claimed is:

1. A method, comprising:

generating a plurality of multilink segmentation and reassembly sublayer cells at a first location;

distributing the plurality of multilink segmentation and reassembly sublayer cells across a plurality of virtual circuits;

transmitting the plurality of multilink segmentation and reassembly sublayer cells to a second location via the plurality of virtual circuits; and receiving the plurality of multilink segmentation and reassembly sublayer cells at the second location.

2. The method of claim 1, wherein generating thee plurality of multilink segmentation and reassembly sublayer cells includes providing each of a plurality of asymmetric transfer mode information cells with a multilink segmentation and reassembly sublayer identifier.

3. The method of claim 1, wherein generating the plurality of multilink segmentation and reassembly sublayer cells includes providing each of the plurality of asymmetric transfer mode information cells with a multilink segmentation and reassembly sequence number.

4. The method of claim 1, wherein distributing the plurality of multilink segmentation and reassembly sublayer cells across the plurality of virtual circuits includes monitoring a virtual circuit buffer status for each of a plurality of virtual circuit buffers.

5. The method of claim 1, wherein distributing the plurality of multilink segmentation and reassembly sublayer cells includes selecting a virtual circuit in which the virtual circuit buffer status indicates a fill level below a low level.

6. The method of claim 1, wherein distributing the plurality of multilink segmentation and reassembly sublayer cells includes waiving a virtual circuit in which the virtual circuit buffer status indicates a fill level above a high level.

7. The method of claim 1, wherein distributing the plurality of multilink segmentation and reassembly sublayer cells includes selecting a virtual circuit in which the virtual circuit buffer status indicates a fill level between the low level and the high level.

8. The method of claim 1, wherein receiving the plurality of multilink segmentation and reassembly sublayer cells includes aggregating the plurality of multilink segmentation and reassembly sublayer cells.

9. The method of claim 8, wherein aggregating the plurality of multilink segmentation and reassembly sublayer cells includes arranging the plurality of multilink segmentation and reassembly sublayer cells in a particular order defined by a plurality of multilink segmentation and reassembly sublayer sequence numbers.

10. The method of claim 9, wherein arranging the plurality of multilink segmentation and reassembly sublayer cells includes writing the plurality of multilink segmentation and reassembly sublayer cells into a double buffer arrangement.

11. A computer program, comprising computer or machine readable program elements translatable for implementing the method of claim 1.

12. An apparatus for performing the method of claim 1.

13. An electronic media, comprising a program for performing the method of claim 1.

14. A method, comprising converting a cell into a multilink segmentation and reassembly sublayer format, including:

receiving an asymmetric transfer mode network cell from a conventional segmentation and reassembly sublayer mechanism;

writing the asymmetric transfer mode network cell to a memory buffer;

reading a plurality of octets from the memory buffer;

appending a multilink segmentation and reassembly sublayer identifier and a multilink segmentation and reassembly sublayer sequence number to the plurality of octets forming a multilink segmentation and reassembly sublayer cell;

transmitting the multilink segmentation and reassembly sublayer cell to a virtual circuit controller;

appending a plurality of header octets to the multilink segmentation and reassembly sublayer cell; and transmitting the multilink segmentation and reassembly sublayer cell via a virtual circuit.

15. The method of claim 14, further comprising receiving another asymmetric transfer mode network cell from the conventional segmentation and reassembly sublayer mechanism.

16. The method of claim 14, wherein writing the asymmetric transfer mode network cell to a memory buffer includes writing the asymmetric transfer mode network cell to a memory buffer utilizing a memory write controller.

17. The method of claim 16, wherein utilizing a memory write controller includes utilizing a write address pointer.

18. The method of claim 14, wherein reading the plurality of octets from a memory buffer includes reading the plurality of octets from a memory buffer utilizing a memory read controller.

19. The method of claim 18, wherein utilizing a memory read controller includes utilizing a read address pointer.

20. The method of claim 14, further comprising:

utilizing the memory write address pointer to select an address in the memory buffer to be written;

utilizing the memory read address pointer to select an address in the memory buffer to be read;

allowing the memory read controller to read a plurality of octets from the memory buffer if the write address pointer is ahead of the read address pointer at least a number of addresses equal to the number of bytes of a multilink segmentation and reassembly sublayer cell; and detecting an error condition if the memory read address pointer overtakes the memory write address pointer.

21. A computer program, comprising computer or machine readable program elements translatable for implementing the method of claim 14.

22. An apparatus for performing the method of claim 14.

23. An electronic media, comprising a program for performing the method of claim 14.

24. A method, comprising converting plurality of multilink segmentation and reassembly sublayer cells into an asymmetric transfer mode format, including:

receiving a plurality multilink segmentation and reassembly sublayer cells from a plurality of virtual circuits;

writing the plurality of multilink segmentation and reassembly sublayer cells to a memory buffer in a sequence defined by a plurality of multilink segmentation and reassembly sublayer sequence numbers;

reading a plurality of octets from the memory buffer;

assembling the plurality of octets into a plurality of asymmetric transfer mode cells; and transmitting the plurality of asymmetric transfer mode cells to a conventional segmentation and reassembly sublayer mechanism.

25. The method of claim 24, wherein writing the plurality of multilink segmentation and reassembly sublayer cells to a memory buffer includes writing the plurality of multilink segmentation and reassembly sublayer cells to a memory buffer utilizing a memory write controller.

26. The method of claim 25, wherein utilizing a memory write controller includes utilizing a write address pointer.

27. The method of claim 25, wherein utilizing a memory write controller includes utilizing a memory write controller to put the plurality of multilink segmentation and reassembly sublayer cells in a sequence determined by a plurality of multilink segmentation and reassembly sublayer cell sequence numbers.

28. The method of claim 24, wherein reading the plurality of octets from a memory buffer includes reading the plurality of octets from a memory buffer utilizing a memory read controller.

29. The method of claim 28, wherein utilizing a memory read controller includes utilizing a read address pointer.

30. The method of claim 24, further comprising:
  utilizing the memory write address pointer to select an address in the memory buffer to be written;
  utilizing the memory read address pointer to select an address in the memory buffer to be read;
  allowing the memory read controller to read a plurality of octets from the memory buffer if the write address pointer is ahead of the read address pointer at least a number of addresses equal to the number of bytes of an asymmetric transfer mode cell; and
  detecting an error condition if the memory read address pointer overtakes the memory write address pointer.

31. A computer program, comprising computer or machine readable program elements translatable for implementing the method of claim 24.

32. An apparatus for performing the method of claim 24.

33. An electronic media, comprising a program for performing the method of claim 24.

34. An apparatus, comprising a multilink segmentation and reassembly sublayer transmitter, including:
  a source buffer;
  a multilink controller coupled to the source buffer; and
  a plurality of virtual circuits coupled to the multilink controller.

35. The apparatus of claim 34, wherein the source buffer includes a source first-in-first-out buffer.

36. The apparatus of claim 34, wherein each of the plurality of virtual circuits include:
  a virtual circuit buffer coupled to the multilink controller;
  a physical layer control mechanism coupled to the virtual circuit buffer; and
  a digital subscriber line pipe coupled to the physical layer control mechanism.

37. The apparatus of claim 36, wherein the virtual circuit buffer includes a virtual circuit first-in-first-out buffer.

38. The apparatus of claim 34, wherein the multilink controller receives a source buffer fill-status line from the source buffer.

39. The apparatus of claim 34, wherein the multilink controller receives a virtual circuit buffer fill-status line from the virtual circuit buffer.

40. An apparatus, comprising a multilink segmentation and reassembly sublayer receiver, including:
  a plurality of virtual circuits;
  a multilink controller coupled to the plurality of virtual circuits;
  a plurality of intermediate buffers coupled to the multilink controller; and
  a receive buffer coupled to the plurality of intermediate buffers.

41. The apparatus of claim 40, wherein the receive buffer includes a source first-in-first-out buffer.

42. The apparatus of claim 40, wherein each of the plurality of virtual circuits include:
  a digital subscriber line pipe;
  a physical layer control mechanism coupled to the digital subscriber pipe; and
  a virtual circuit buffer coupled to the physical layer and to the multilink controller.

43. The apparatus of claim 42, wherein the virtual circuit buffer includes a virtual circuit first-in-first-out buffer.

44. The apparatus of claim 40, wherein the plurality of intermediate buffers includes a pair of intermediate buffers.

45. An apparatus, comprising a segmentation and reassembly sublayer converter, including:
  a segmentation and reassembly sublayer mechanism;
  a memory write controller coupled to the segmentation and reassembly sublayer mechanism;
  a memory buffer coupled to the memory write controller;
  a memory read controller coupled to the memory buffer; and
  a virtual circuit controller coupled to the memory read controller.

46. The apparatus of claim 40, wherein the memory buffer includes a circular memory buffer of size 1104 bytes.

* * * * *